April 9, 1929.    R. D. EVANS    1,708,668
TIRE FABRIC CONSTRUCTION
Filed Jan. 17, 1928
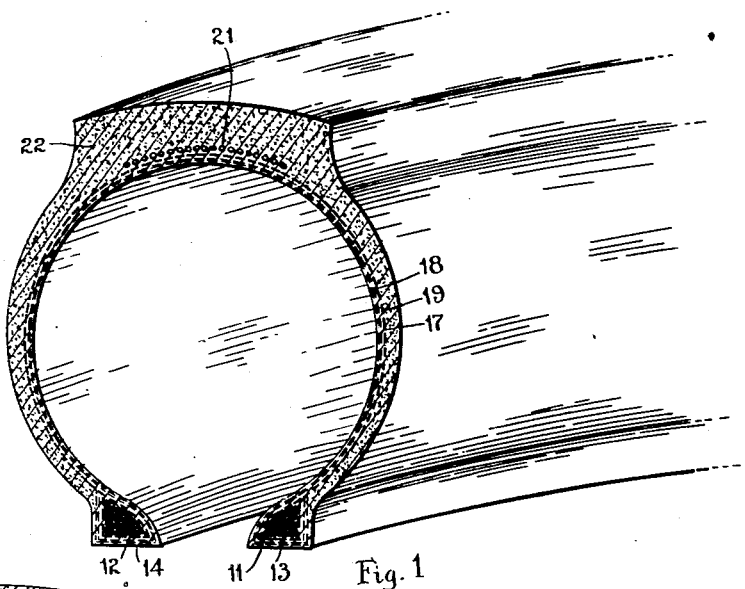
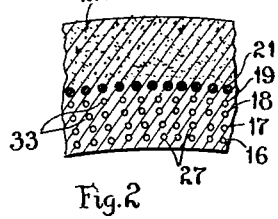
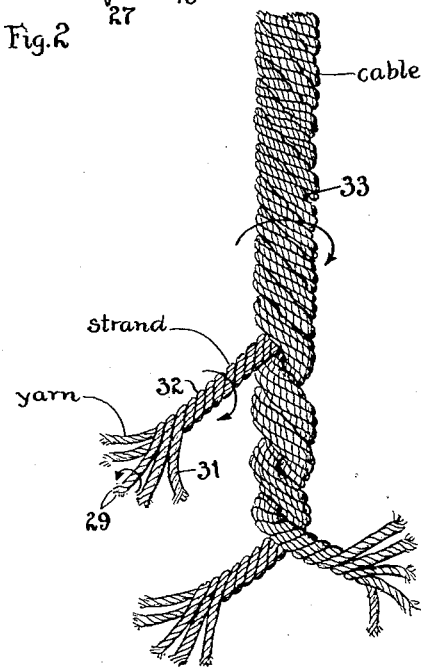
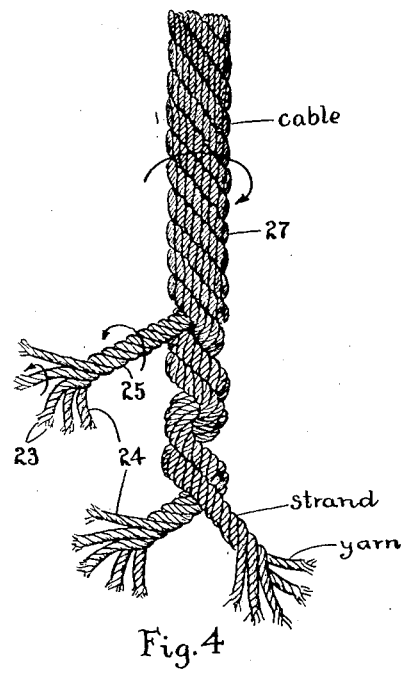
Inventor
Rhys D. Evans
Attorney

Patented Apr. 9, 1929.

1,708,668

UNITED STATES PATENT OFFICE.

RHYS D. EVANS, OF AKRON, OHIO, ASSIGNOR TO THE GOODYEAR TIRE & RUBBER COMPANY, OF AKRON, OHIO, A CORPORATION OF OHIO.

TIRE-FABRIC CONSTRUCTION.

Application filed January 17, 1928. Serial No. 247,295.

My invention relates to the construction of pneumatic tires and it has particular relation to the construction and arrangement of fabric plies within the carcasses of such tires.

More specifically, the invention has for one of its objects the provision of a novel arrangement of plies of fabric of different character within a pneumatic tire carcass, whereby the durability of the tire is enhanced.

The invention contemplates the provision of a pneumatic cord tire in which the inner plies of the tire carcass are formed of cords having a relatively high degree of elasticity, while the outer plies are formed of fabric composed of cords having great resistance to internal wear due to chafing between the elements constituting the cords.

For a better understanding of the invention, reference may now be had to the accompanying drawings, forming a part of the disclosure, in which;

Figure 1 is a perspective cross-sectional view of a tire illustrating a cord fabric carcass constructed according to the invention;

Figure 2 is a fragmentary cross-sectional view, on a larger scale, showing in detail the plies embodied in a tire;

Figure 3 is an elevational view of a portion of a cord which is so twisted as to have the yarns at the inner central portion thereof disposed substantially parallel to the axis of the cord; and Figure 4 is an elevational view of a cord illustrating the manner in which the elements of cords are usually twisted.

Pneumatic cord tires, as commonly constructed, comprise a pair of non-extensible beads 11 and 12, which are enclosed within the marginal portions 13 and 14 of a plurality of plies of rubberized fabric that form the carcass of the tire. For purposes of illustration, there are shown two inner plies 16 and 17 and two outer piles 18 and 19. This is probably the minimum number of plies ordinarily embodied in a pneumatic tire. However, this number is often exceeded, particularly in the larger sizes of tires, such as those employed on heavy automobiles and busses.

A breaker strip 21, formed of fabric, is commonly placed about the outer periphery of the tire carcass. This strip functions as a cushion between the tread portion 22 and the outer ply 19 of the carcass, whereby to insure a strong union between the tread portion and the carcass that is capable of efficiently withstanding the forces to which the tire is subjected.

In a tire of known constructions the several plies have been composed of cords such as those represented in Figure 4 of the drawing. These cords are formed by twisting or spinning elements of progressively increasing size. Thus, in the example illustrated in Figure 4, fibers 23 are spun to form yarns 24. A plurality of yarns are then twisted to form strands 25, and a plurality of the latter are in turn twisted to form a cable or a cord 27.

Most commonly in the cords employed in pneumatic tire fabric, each strand is composed of five yarns and the three strands are twisted to form the completed cord. The direction of the twist of the various elements may be varied. However, it is customary to twist a group of yarns in one direction to form the strands and then to twist the strands in the opposite direction to form the cable. If this method of construction is employed, there are four possible ways of twisting the various elements which may be enumerated as follows:

| | Yarn. | Strand. | Cable. |
|---|---|---|---|
| 1. | Right. | Left. | Right. |
| 2. | Left. | Left. | Right. |
| 3. | Right. | Right. | Left. |
| 4. | Left. | Right. | Left. |

In spinning cords of conventional form, it is customary to give the various elements that degree of twist which will impart to the finished cord the maximum degree of tensile strength. In the patent to Samuel A. Steere, No. 1,632,201, is disclosed a method of spinning cords having the conventional directions of twist, but in which the various elements are given a materially higher degree of twist than that required to impart the maximum degree of tensile strength thereto. Cords formed in this manner are relatively lower in tensile strength, but they have a materially higher degree of elasticity, than cords having that degree of twist required to impart thereto the maximum tensile strength. It has been found that cords formed in this manner are materially more durable than the old type of cords when embodied in the fabric of which the tires are composed. This is the type of cord shown by Figure 4.

In my copending application Serial No. 15,233, filed March 13, 1925, now matured into Patent No. 1,689,119, October 23, 1928, is disclosed a cord fabric in which the cords differ from those in the conventional tire fabrics in the relative direction of twist of the various elements. A cord of this type is illustrated in Figure 3 of the drawings. In the cords illustrated the fundamental elements are the fibers 29 which are twisted in any desired direction to form yarns 31. The latter, in turn, are twisted in a direction reverse to the direction of twist of the fibers to form strands 32 which are formed into the cable or cord 33 by twisting a plurality of them (commonly three) in the same direction as that in which the yarns forming the strands are twisted.

It will be observed that cords formed in this manner have the portions of the yarns lying adjacent the central axis of the cord disposed substantially parallel to such axis. This disposition of the yarns prevents undue frictional engagement between the yarns of adjacent strands and so prevents undue wear when the cords are flexed. Cords of this type have been found to withstand repeated flexure under tension much longer than cords having the regular style of twist in which the yarns are disposed substantially perpendicularly to the axis of the cord in the manner represented in Figure 4. Cords of this style, however, do not have as much elasticity as the highly twisted cords disclosed in Patent No. 1,632,201.

In a tire constructed according to the principles of this invention, the inner plies 16 and 17 of the tire carcass are formed of cords 27 having a relatively high degree of twist, such as those disclosed in Patent No. 1,632,201, and having the usual direction of twist. The degree of twist in cords of this type may exceed by as much as 18 to 26 percent, or even more, the degree of twist required to impart the maximum degree of tensile strength to the cords. The outer plies of fabric 18 and 19 are composed of cords 33 which are so spun as to have the strands and cables twisted in the same direction. That is, the direction of twist of the various elements is right, left, left, or left, right, right, in the manner taught by my copending application, mentioned above. It appears that elasticity rather than ability to withstand repeated flexure governs the life of the inner ply of fabric, whereas ability to withstand repeated flexure rather than a high degree of elasticity governs the life of the cords in the outer plies of fabric. Therefore, a tire carcass constructed in accordance with the principles of this invention is materially more durable than a tire carcass which is composed entirely of such highly twisted cords 27 as those disclosed in the patent to Steere or a carcass which is composed entirely of cords 33 having the last two elements thereof twisted in reverse direction, such as those disclosed in my copending application.

It is, of course, to be understood that my invention is not limited to cords which consist of three strands which are, in turn, composed of five yarns, but practically any convenient number of strands and yarns desired may be employed. The invention also is not limited to tires having two plies of highly twisted cords and two outer plies of highly flexible cords. Practically any convenient number of plies may be employed and the number of plies composed of the cords 27 may be greater or less than the number of plies composed of cords 33, depending upon the character of the tire embodying the invention.

Although I have illustrated only the preferred forms which my invention may assume and have described those forms in detail, it will be apparent to those skilled in the art that it is not so limited, but that various minor modifications may be made therein without departing from the spirit of the invention or from the scope of the appended claims.

What I claim is:

1. A tire carcass comprising an inner ply of cord fabric composed of cords having a materially higher degree of twist than that required to impart maximum tensile strength to the cords and an outer ply of fabric composed of cords whose yarns adjacent the central axis thereof are disposed substantially parallel to the axis.

2. A tire carcass comprising an inner ply of cord fabric constructed of cords having a degree of twist materially greater than that required to impart maximum tensile strength to the cords and an outer ply of cord fabric composed of cords, having yarns twisted in a given direction and having strands and cables twisted in a direction reverse to the direction of twist of the yarns.

3. A tire carcass comprising an inner ply of cord fabric, the cords of which have a degree of twist at least eighteen percent higher than that required to impart maximum tensile strength to the cord and an outer ply composed of cords having yarns at the central portions thereof disposed substantially parallel to the neutral axis of the cord.

4. A pneumatic tire carcass comprising an inner ply of cord fabric the cords of which have a degree of twist at least eighteen percent higher than that required to impart maximum tensile strength to the cords and an outer ply composed of cords having the last two elements thereof twisted in the same direction.

In witness whereof, I have hereunto signed my name.

Signed at Akron, in the county of Summit and State of Ohio, U. S. A., this 16 day of January, 1928.

RHYS D. EVANS.